ALFRED P. GABRIEL
ROBERT E. LEE
RICHARD C. MOHRMAN
INVENTORS

BY Charles C. Krauczyk

ATTORNEY

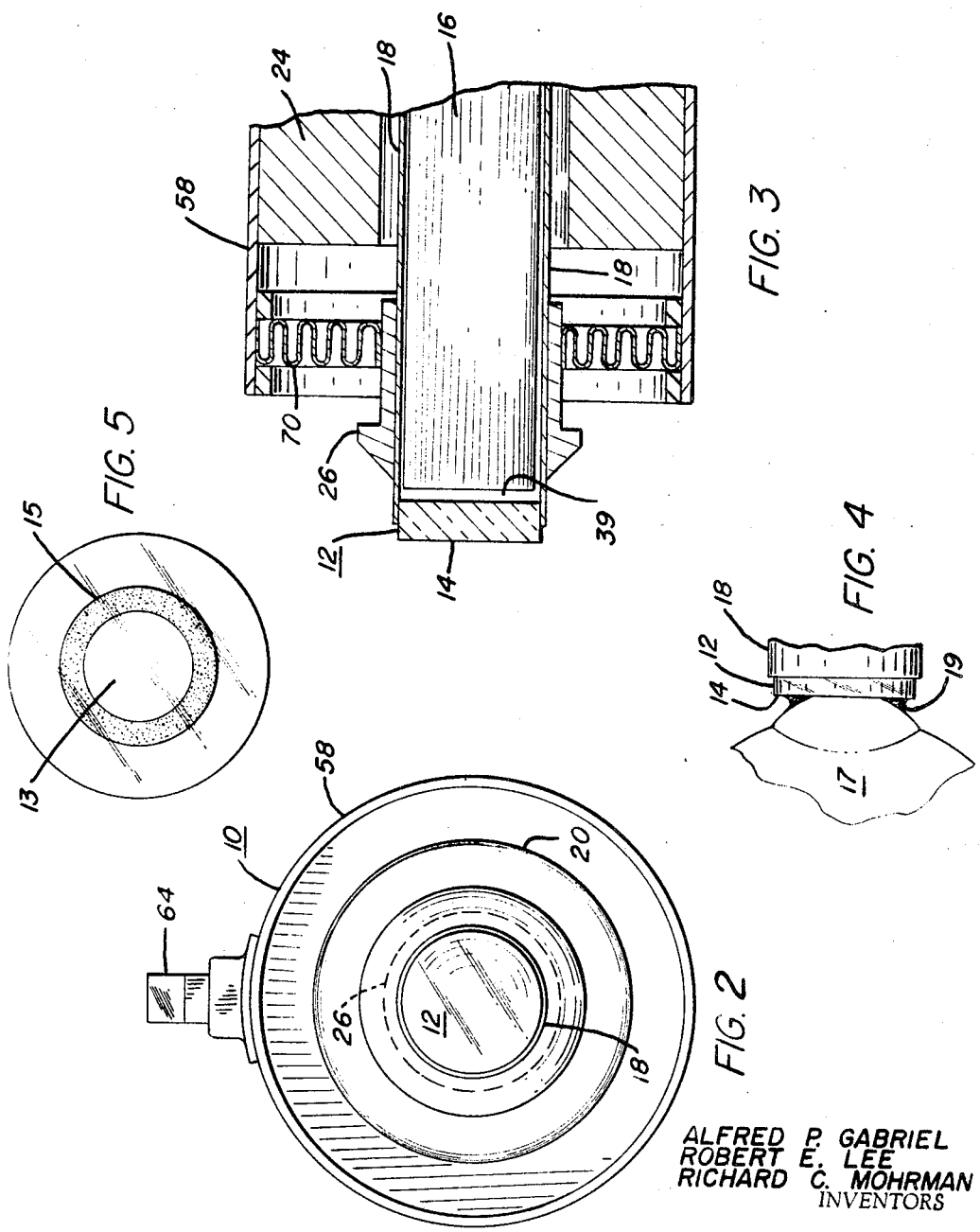

United States Patent Office 3,449,946
Patented June 17, 1969

3,449,946
PROBE FOR PHOTOELECTRIC APPLANATION TONOMETERS
Alfred P. Gabriel, Greece, N.Y., Robert E. Lee, Morgantown, W. Va., and Richard C. Mohrman, Irondequoit, N.Y., assignors to Bausch & Lomb Incorporated, Rochester, N.Y., a corporation of New York
Filed Apr. 24, 1967, Ser. No. 633,021
Int. Cl. A61b 9/00
U.S. Cl. 73—80     12 Claims

ABSTRACT OF THE DISCLOSURE

A probe for a photoelectric applanation tonometer including a movable transparent tip portion or contact anvil mounted in place with a highly flexible spring means and closely spaced to an elongated radiation transparent cable means adapted for transmitting radiation from the portion of an eye engaged by the tip portion through the probe towards a radiation sensitive device. A transducer is coupled to the tip portion to generate a signal corresponding to the movement of the tip portion and therefore provides an indication of the force applied to an eye by the probe.

BACKGROUND OF THE INVENTION

Field of the invention

This invention relates to tonometer apparatus for measuring and testing the intraocular pressure of an eye.

Description of the prior art

The probe of this application is adapted for use with photoelectric applanation tonometer systems of the type disclosed in a copending patent application Ser. No. 633,020 filed on the same day as the present application for R. C. Mohrman, entitled "Optical Scanning System" and assigned to assignee of the present application.

An applanation tonometer is an instrument used to measure the intraocular pressure to aid in the diagnosis of diseases characteristic of the eye, such as glaucoma. A probe is generally depressed against the eye so that the force applied and the corresponding deformation of the eye provides an accurate measure of the intraocular pressure.

For ease of operation, it is desirable that the probe be a hand held instrument. This requires that the probe be light and comfortable to handle. In addition, the probe should also be able to be used in any space orientation from horizontal to vertical. Furthermore, the probe should be sealed from elements such as dust, humidity, etc., and capable of being cleaned by standard techniques, such as by wiping with antiseptics, for repetitive use.

Since the human eye is a very sensitive organ the amount of force to be applied thereto should be as slight as possible. For example, it is desirable that the force applied to the eye be in the range of 10 grams or less. If substantially greater forces are repeatedly applied to the eye there is a danger that the aqueous humor between the cornea and the eye lens may be expelled. This in turn will result in readings of pressure that are falsely low.

With this small range of force, any resilient mounting for the movable components in the probe must be extremely flexible to provide a fair degree of movement that can be readily detected and still be essentially friction free and exhibit substantially no hysteresis effect. Furthermore, the mounting should be sufficiently rigid to minimize effects due to gravity. In the case of probes for photoelectric tonometers, an optical system should be provided with an efficient means for transmitting radiation from the eye to the radiation sensitive device to provide a maximum amount of system sensitivity.

The probe of this application is an improvement over the probes in two copending patent application Ser. Nos. 378,846 and 379,123 and assigned to the assignee of the present application, now Patents 3,338,089 and 3,338,090, respectively.

SUMMARY OF THE INVENTION

A probe for a photoelectric applanation tonometer having a radiation transparent tip portion or contact anvil for engaging and deforming the portion of the eye engaged. The tip portion is resiliently mounted with at least one bellows type spring for movement along a predetermined path. A radiation transparent element or cable is mounted adjacent the tip portion to receive radiation from the tip portion corresponding to the image of the portion of the eye deformed and is adapted to transmit the radiation through the probe toward a photosensitive device. A transducer means, such as a differential transformer, is coupled to the tip portion to generate a signal corresponding to the movement of the tip portion to provide an indication of the amount of force applied to an eye. The probe is adapted for use with a photoelectric system that measures the size of the area deformed from the radiation transmitted, and also measure the force from the transducer to provide a reading corresponding to the intraocular pressure of an eye being tested.

BRIEF DESCRIPTION OF THE DRAWINGS

FIGURE 2 is an end view of the probe of FIGURE 1.
FIGURE 3 is a portion of the probe of FIGURE 1 illustrating a modified resilient mounting means.
FIGURE 4 is an illustration of the tip portion of the probe of FIGURES 1–3 engaging an eye.
FIGURE 5 is an illustration of an image transmitted through the probe of FIGURES 1–3 with the tip portion engaging the eye as illustrated in FIGURE 4.

DESCRIPTION OF THE PREFERRED EMBODIMENTS

Figure 1:
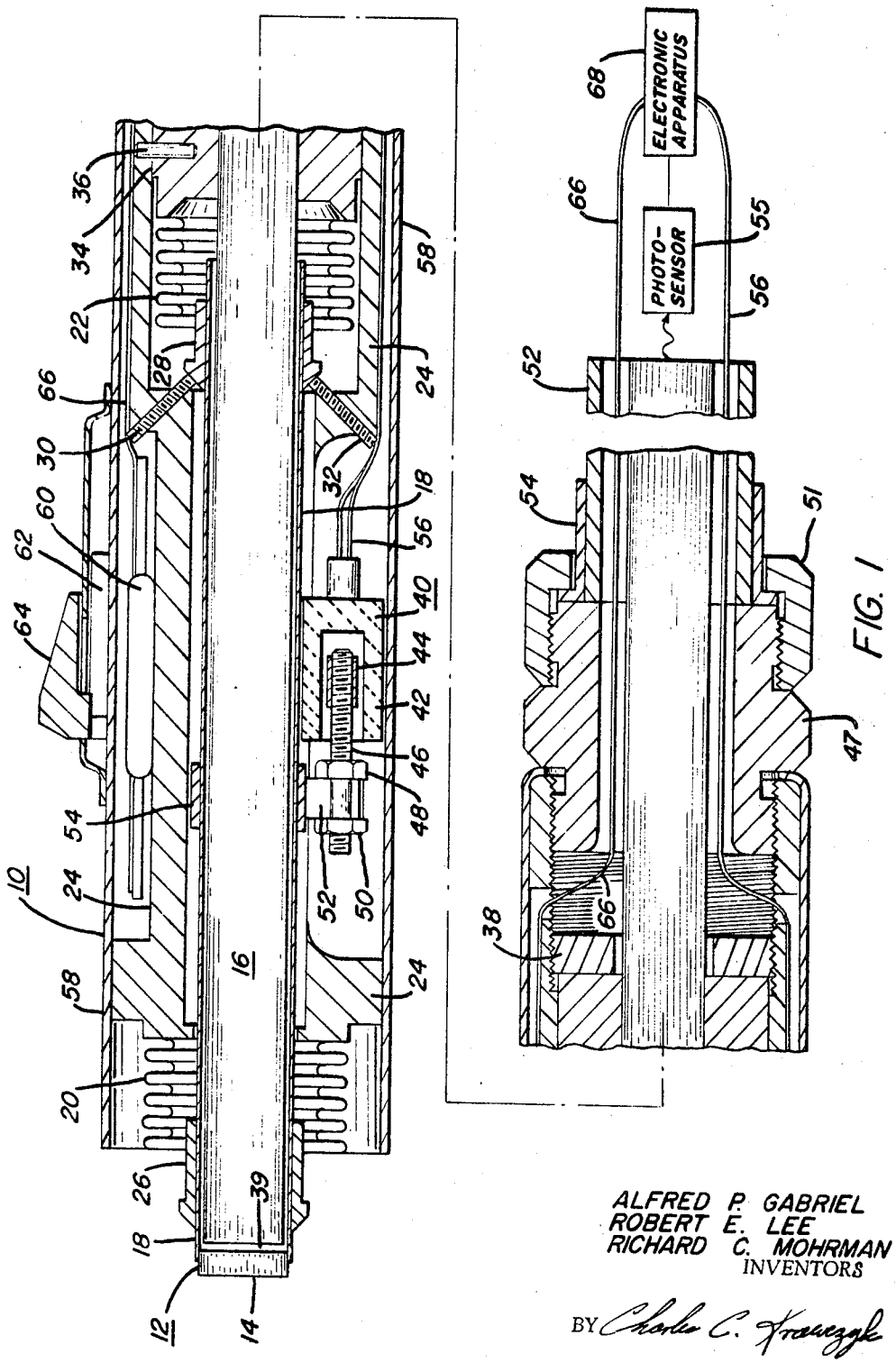
FIGURE 1 is a cross-sectional view of a probe embodying the invention.

In FIGURE 1 the probe 10 includes a cylindrical disk shaped tip portion or contact anvil 12 formed of fused optical glass fibers in a coherent bundle. A coherent bundle is one in which a source or an object at one end of the bundle is correspondingly imaged at the other end. The end or surface 14 of the tip portion 12 comprises a substantially flat surface that is adapted to engage and flatten a portion of the eye to be tested as illustrated in FIGURE 4. An image of the portion of the eye so engaged is transmitted through the tip portion 12 to a radiation transmitting element or cable 16.

The image may for example take the form of a circle 13 or an annulus 15 as illustrated in FIGURE 5. The annulus 15 is due to a meniscus ring 19 formed between the portion of the eye immediately surrounding the flattened surface of the eye and the tip surface 14 due to a surface tension effect on the liquid in the eye. It should be noted that meniscus ring 19 has a generally triangular cross-section. When a solution such as disodium fluorescium is added to the eye the annular image 15 can be clearly observed. If no solution is added, the circle 13 will be generally observed.

The tip portion 12 is attached to a hollow cylindrical tube or barrel 18 that extends into the probe and concentrically surrounds the radiation transmitting element or cable 16. The cylindrical tube 18 is supported at opposite ends by a pair of cylindrical bellows type springs 20 and 22. The bellows spring 20 is coupled between a core or base structure 24 and a cylindrical collar 26 that is attached to one end of the tube 18. The spring 22 is coupled between the core 24 and a cylindrical collar 28 attached to the opposite end of the tube 18. Accordingly, the tip portion 12 is adapted to move towards the probe 10 when an eye is engaged, the amount of movement being dependent upon the force applied to the eye. A pair of set screws 30 and 32 extend through the core 24 and are positioned to engage the collar 28 to provide a limit of travel for the tip portion 12 in a direction away from the probe 10.

The radiation transmitting element or cable 16 comprises a coherent glass fiber bundle that is rigidly held in coaxial alignment with the tube 18 by a cylindrical bushing 34, which is in turn held in place by a pin 36 and a stop nut 38. The portion of the radiation transmitting element 16 extending from the bushing 34 towards the tip portion 12 can be supported in a cylindrical metal tube or else formed into a rigid bundle by a fusing process or cementing process with epoxy.

The tip portion 12 and the radiation transmitting element 16 are separated by a spacing 39 in the order of ten thousandths of an inch (exaggerated in FIGURES 1 and 3 for purposes of illustration). The short air gap provides a sufficient degree of movement for the tip portion 12 without degrading the image transmitted therebetween.

The movement of the tube 18 is detected by a linear differential transformer 40. The differential transformer 40 includes a winding portion 42 that is stationarily mounted to the base structure or core 24 and a movable transformer core 44 extending axially through the winding. The movable core 44 is connected to a screw type extension 46 which in turn is fastened by a pair of lock nuts 48 and 50 to an extension arm 52. The extension arm 52 is attached to a cylindrical collar 54 that is secured to, and moves with, the tube 18. Accordingly, as the tube 18 moves (depending upon the force applied by the tip portion 12) the differential transformer 40 generates an electrical signal corresponding to the extent of the movement. For the described short range of movement there is a substantially direct relation between the resilient force of the bellows springs 20 and 22 and the movement of the tube 18.

The plurality of wires 56 provide connections for the excitation voltage for energizing the differential transformer 40 and receive the electrical signal corresponding to the movement of the tube 18. The wires wind through openings formed in the core 24, through a connector nut 47 making a threaded connection with core 24, to form part of the cable 52 for transmitting the signals generated by the probe to the electric apparatus used in conjunction with the probe. A collar 54 is clamped to the cover of the cable 52 and is secured to the probe 10 by a cap nut 51 making a threaded connection with the connector nut 47.

The differential transformer 40 can be readily calibrated by loosening the nuts 48 and 50 and adjusting the screw 46 for the desired zero signal when the tube 18 is in a reference position. Alternately, the extension arm 52 and the collar 54 can form a spring clip retainer that can be snapped into place to capture the tube 18. In such case, the movable transformer core 44 can be calibrated by sliding the spring clip retainer along the tube 18.

The probe 10 is enclosed with a shell or casing 58 to provide a sealed unit. The bellows springs 20 and 22 can be made of a metal, such as nickel, and are secured in a fashion to effectively provide a tight seal for the probe. This is highly desirable since the probe can be cleaned or disinfected between tests by standard wiping procedures with an antiseptic solution.

A reed switch 60 is mounted to the core 24 within the shell 58 to provide means for inactivating the associated electronic measuring circuit until shortly before taking a reading. An actuator for the reed switch 60 comprises a magnet 62 attached to a sliding type button 64 suitably mounted to the outer portion of the shell 58. In response to a sliding movement of the button 64, the magnet 62 is moved into position to actuate the reed switch 60. The connection to the reed switch is made through a pair of wires 66 that wind through openings provided in the core 24 and the connector nut 47 to form part of the cable 52 for connection to the electronic apparatus 68 employed. It should be noted that the combination of the reed switch 60 and the magnet 62 provide a sealed type of switch for the probe 10.

The FIGURE 3 illustrates the engaging portion of the probe 10 with a modified spring mounting for the tube 18. A diaphram type bellows spring 70 is suitably connected between the collar 26 and the core 24 rather than the cylindrical type bellows spring 20 of FIGURE 1. A similar type substitute can be used for the spring 22 of FIGURE 1.

In the probes of the figures a bellows type spring provides a very light resilient and linear force vs. displacement mounting for the tip portion 12. Essentially no hysteresis effect has been observed with the bellows spring type mounting. Each time the tip portion 12 engages an eye to apply the required force and is subsequently released, the tip portion for all practical purposes is repositioned at the original reference point from which the measurements were made. In addition to the foregoing, the bellows type springs provide an efficient seal for the moving components of the probe. The inner portion of the probe (between the bellows spring) is essentially sealed from dust, dirt, tears and humidity. As a result, the entire probe can be effectively cleaned with a liquid antiseptic by standard wiping procedures so that the probe can be repetitively used without changeable tips, or replaceable covering devices.

The use of the fiber glass bundles in the tip portion 12 and the transmitting element 16 provides an efficient means of transmitting a sharp image of the portion of the eye engaged by the tip portion or the annulus. The spacing between the tip portion 12 and the radiation transmitting element 16 provides a sufficient degree of movement of the tip portion from which the force applied to the eye can be accurately and readily detected by the differential transformer 40 and still allows for the transmission of the image between the tip portion and the radiation transmitting element without significant loss of the resolution in the radiation signal through the air gap. The mass of the moving components (tip portion 12 and tube 18) is extremely small thereby allowing the use of the highly flexible bellows type spring without introducing substantial mounting problems due to gravity effects or resonance problems. It was found that the bellows type springs provide the linear resilient force in about the range of ten grams with essentially no dead band or hysteresis effect and still provide a substantially rugged mounting that is capable of withstanding the abuse of normal repetitive use.

The probe, as illustrated, is a comfortably handled and very light hand-held instrument. The radiation transmitting element 16 can, for example, terminate within the probe to apply radiation to a sensing device installed within the probe 10 or can extend without the probe to form a portion of a flexible optical cable adapted to be connected to the associated photoelectric apparatus.

It should be noted that a sharp image is transmitted through the radiation transmitting element 16. Accordingly the image can be scanned in the manner as taught in the copending applications Ser. Nos. 378,946, 379,123 and 633,020 to provide a time based signal that can be readily detected to provide a very accurate measurement of the area of the eye deformed by the tip portion 12.

What is claimed is:

1. A probe for a photoelectric applanation tonometer comprising:

a radiation transparent tip portion having an end to engage an eye;

supporting means;

means including at least one bellows type spring movably mounting said tip portion to said supporting means;

a radiation transparent elongated element;

means for mounting said transparent element with one end positioned adjacent said tip so that said transparent element transmits radiation received from said tip through said probe, and transducer means coupled to said tip portion for generating a signal corresponding to the movement of said tip portion relative to said supporting means.

2. A probe for a photoelectric applanation tonometer as defined in claim 1 wherein said tip portion comprises a glass fiber bundle disc adapted to transmit radiation corresponding to the size of the area of an eye engaged toward said transparent element, and said transparent element comprises a substantially longer cylindrical glass fiber bundle adapted to direct radiation received from said tip portion toward a photoelectric device.

3. A probe for a photoelectric applanation tonometer as defined in claim 2 wherein said tip portion and said element comprise coherent glass fiber bundles.

4. A probe for a photoelectric applanation tonometer as defined in claim 3 wherein said tip portion comprises a fused glass fiber bundle.

5. A probe for a photoelectric applanation tonometer as defined in claim 1 wherein means movably mounting said tip portion to said supporting means comprises:

an elongated hollow tube having one end connected to said tip portion;

first and second bellows type springs;

means connecting said first spring between the end of said tube connected to said tip portion and said supporting means, and means connecting said second spring between said other end of said tube and said supporting means.

6. A probe for a photoelectric applanation tonometer as defined in claim 5 wherein said transparent element is stationarily mounted to said support means to extend coaxially in said tube so that one end is positioned adjacent said tip portion to receive radiation from said tip portion.

7. A probe for a photoelectric applanation tonometer as defined in claim 6 wherein said tip portion and said element comprise glass fiber bundles, and said tip portion and said element are spaced apart by a dimension on the order of ten thousandths of an inch.

8. A probe for a photoelectric applanation tonometer as defined in claim 6 wherein said transducer means is coupled to said tube.

9. A probe for a photoelectric applanation tonometer comprising:

supporting structure;

a glass fiber bundle cable for transmitting radiation received at one end, through said supporting structure to an opposite end toward a sensing device;

a glass fiber bundle tip portion substantially shorter than said cable having one end adapted to engage an eye to transmit therethrough radiation corresponding to the portion of the eye so engaged;

bellows spring mounting means coupled between said supporting structure and said tip portion for resiliently mounting said tip portion for movement along a predetermined path;

means for stationarily mounting said cable to said supporting structure with one end mounted adjacent said tip portion so that the radiation transmitted through said tip is received by said cable, and transducer means coupled to said bellows spring mounting for generating a signal corresponding to the movement of said tip portion.

10. A probe for a photoelectric applanation tonometer as defined in claim 9 wherein said bellows spring mounting means comprises, a cylindrical tube having one end connected to said tip portion, at least one bellows type spring coupled between said supporting structure and said tube for resiliently positioning said tube in said supporting structure and wherein said cable extends coaxially through said tube with one end of said cable mounted adjacent tip portion.

11. A probe for a photoelectric applanation tonometer as defined in claim 10 wherein said tip portion and said cable are coherent glass fiber bundles so that an image corresponding to the amount of the eye engaged by said tip portion is transmitted through said tip portion and said cable.

12. A probe for a photoelectric applanation tonometer as defined in claim 10 wherein said tip portion and said one end of said cable are separated by a dimension on the order of ten thousandths of an inch.

References Cited

UNITED STATES PATENTS

| | | | |
|---|---|---|---|
| 3,150,520 | 9/1964 | Mackay | 73—80 |
| 3,150,521 | 9/1964 | Mackay | 73—80 |
| 3,338,089 | 8/1967 | Coombs | 73—80 |

RICHARD C. QUEISSER, *Primary Examiner.*

C. E. SNEE, *Assistant Examiner.*